(12) United States Patent
Johri et al.

(10) Patent No.: US 11,186,267 B2
(45) Date of Patent: Nov. 30, 2021

(54) METHODS AND SYSTEM FOR OPERATING A DRIVELINE IN A SPEED CONTROL MODE

(71) Applicant: Ford Global Technologies, LLC, Dearborn, MI (US)

(72) Inventors: Rajit Johri, Canton, MI (US); Fazal Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 16/265,351

(22) Filed: Feb. 1, 2019

(65) Prior Publication Data
US 2020/0247388 A1 Aug. 6, 2020

(51) Int. Cl.
| | |
|---|---|
| *B60W 20/10* | (2016.01) |
| *B60W 10/08* | (2006.01) |
| *B60W 30/18* | (2012.01) |
| *B60K 6/387* | (2007.10) |
| *B60K 6/40* | (2007.10) |
| *F02D 33/00* | (2006.01) |
| *F02P 5/15* | (2006.01) |
| *B60W 10/06* | (2006.01) |
| *B60K 6/24* | (2007.10) |
| *B60K 6/26* | (2007.10) |

(52) U.S. Cl.
CPC ............. *B60W 20/10* (2013.01); *B60K 6/387* (2013.01); *B60K 6/40* (2013.01); *B60W 10/06* (2013.01); *B60W 10/08* (2013.01); *B60W 30/18063* (2013.01); *F02D 33/006* (2013.01); *F02P 5/1502* (2013.01); *B60K 6/24* (2013.01); *B60K 6/26* (2013.01); *B60W 2510/101* (2013.01); *B60W 2710/0666* (2013.01); *B60W 2710/081* (2013.01); *B60Y 2200/92* (2013.01); *F02D 2250/18* (2013.01)

(58) Field of Classification Search
CPC ................. B60W 20/10; B60W 10/08; B60W 30/18063; B60W 10/06; B60W 2710/0666; B60W 2710/081; B60W 2510/101; B60K 6/387; B60K 6/40; B60K 6/24; B60K 6/26; F02P 5/1502; B60Y 2200/92; F02D 29/02; F02D 33/006; F02D 2250/18; Y02T 10/70
USPC ........................................................ 701/22
See application file for complete search history.

(56) References Cited

U.S. PATENT DOCUMENTS

| | | | |
|---|---|---|---|
| 8,892,289 B2 | 11/2014 | Reed et al. | |
| 9,849,869 B2 * | 12/2017 | Frank ..................... | B60K 6/442 |
| 2011/0139117 A1 | 6/2011 | Kar et al. | |
| 2012/0138016 A1 * | 6/2012 | Martin .................. | F02P 5/1504 |
| | | | 123/406.23 |
| 2013/0296124 A1 * | 11/2013 | Pietron .................... | B60K 6/26 |
| | | | 477/5 |

(Continued)

*Primary Examiner* — Jonathan M Dager
*Assistant Examiner* — Jean W Charleston
(74) *Attorney, Agent, or Firm* — David Kelley; McCoy Russell LLP

(57) ABSTRACT

Systems and methods for operating a driveline of a hybrid vehicle are described. In one example, a torque of an engine is adjusted in response to an error between an actual electric machine torque and a minimum electric machine torque plus an offset torque. The reduction of engine torque may be performed when a driveline is operating in a speed control mode.

14 Claims, 5 Drawing Sheets

(56) References Cited

U.S. PATENT DOCUMENTS

| | | | |
|---|---|---|---|
| 2013/0296125 A1* | 11/2013 | Gibson | B60W 20/10 477/5 |
| 2013/0296132 A1* | 11/2013 | Doering | B60W 10/08 477/86 |
| 2015/0039193 A1 | 2/2015 | Livshiz et al. | |
| 2015/0210262 A1* | 7/2015 | Mitchell | B60W 10/026 701/22 |
| 2015/0239467 A1* | 8/2015 | Wang | B60W 20/40 477/5 |
| 2015/0266461 A1* | 9/2015 | Sahashi | B60W 20/10 477/5 |
| 2017/0203751 A1* | 7/2017 | Ozono | B60W 10/06 |
| 2017/0259810 A1* | 9/2017 | Zhang | B60W 20/10 |
| 2018/0201116 A1* | 7/2018 | Miyagawa | B60W 50/0097 |

\* cited by examiner

METHODS AND SYSTEM FOR OPERATING A DRIVELINE IN A SPEED CONTROL MODE

FIELD

The present description relates to methods and a system for operating a driveline of a hybrid vehicle.

BACKGROUND AND SUMMARY

An electric machine and an internal combustion engine may be included in a hybrid vehicle driveline to provide propulsive effort. The internal combustion engine may be have a higher maximum torque output capacity and a higher power output capacity than the electric machine, but the electric machine may respond to a request for additional or less torque more quickly than the engine. According to these characteristics, when both the engine and the electric machine are operating, the electric machine may be operated in a speed control mode (e.g., electric machine speed is adjusted to follow a requested or desired speed while electric machine torque is allowed to vary to meet the requested or desired speed) while at the same time the engine is operated in a torque control mode (e.g., engine torque is adjusted to follow a requested or desired torque while engine speed is allowed to vary to meet the requested or desired torque). Thus, the engine and the electric machine are operated in different modes at the same time. This allows the electric machine to accurately control driveline speed during conditions where it may be more difficult to control the engine in a speed control mode. For example, the engine may be operated in a torque control mode and the electric machine may be operated in a speed control mode during park or neutral idle conditions, during creep mode where driver demand torque is low and the brake pedal is released, or when the vehicle is coasting with an open torque converter. However, if the engine is generating a greater torque than is requested due to modeling errors or other factors, torque converter impeller speed may flare (e.g., increase) more than is desired because the electric machine may have insufficient torque capacity to counteract the engine torque and control engine speed. In addition, at higher speeds, torque production of the electric machine may be reduced, which may also make it difficult for the electric machine to maintain torque converter impeller speed at a requested or desired speed. Therefore, it may be desirable to provide a way of operating the driveline so that the possibility of driveline speed flares may be reduced.

The inventors herein have recognized the above-mentioned issues and have developed a driveline operating method, comprising: via a controller, operating an engine in a torque control mode and an electric machine in a speed control mode; and reducing torque of the engine in response to an error torque, the error torque a present actual electric machine torque minus a minimum torque of the electric machine.

By reducing engine torque responsive to an error torque that is equal to the electric machine torque minus a minimum torque of the electric machine, it may be possible to provide the technical result of reducing the possibility of generating torque converter impeller speed flares. In particular, when torque of the electric machine approaches a minimum torque threshold, then engine torque may be reduced so that engine torque does not overcome electric machine torque. Consequently, speed of the driveline may be controlled to a requested speed even during conditions when the requested speed increases and the torque capacity of the electric machine may be reduced.

The present description may provide several advantages. In particular, the approach may improve driveline speed control. Further, the approach may prevent torque converter impeller speed flares. In addition, the approach may increase a life span of the electric machine by reducing a possibility of operating the electric machine near its capacity.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
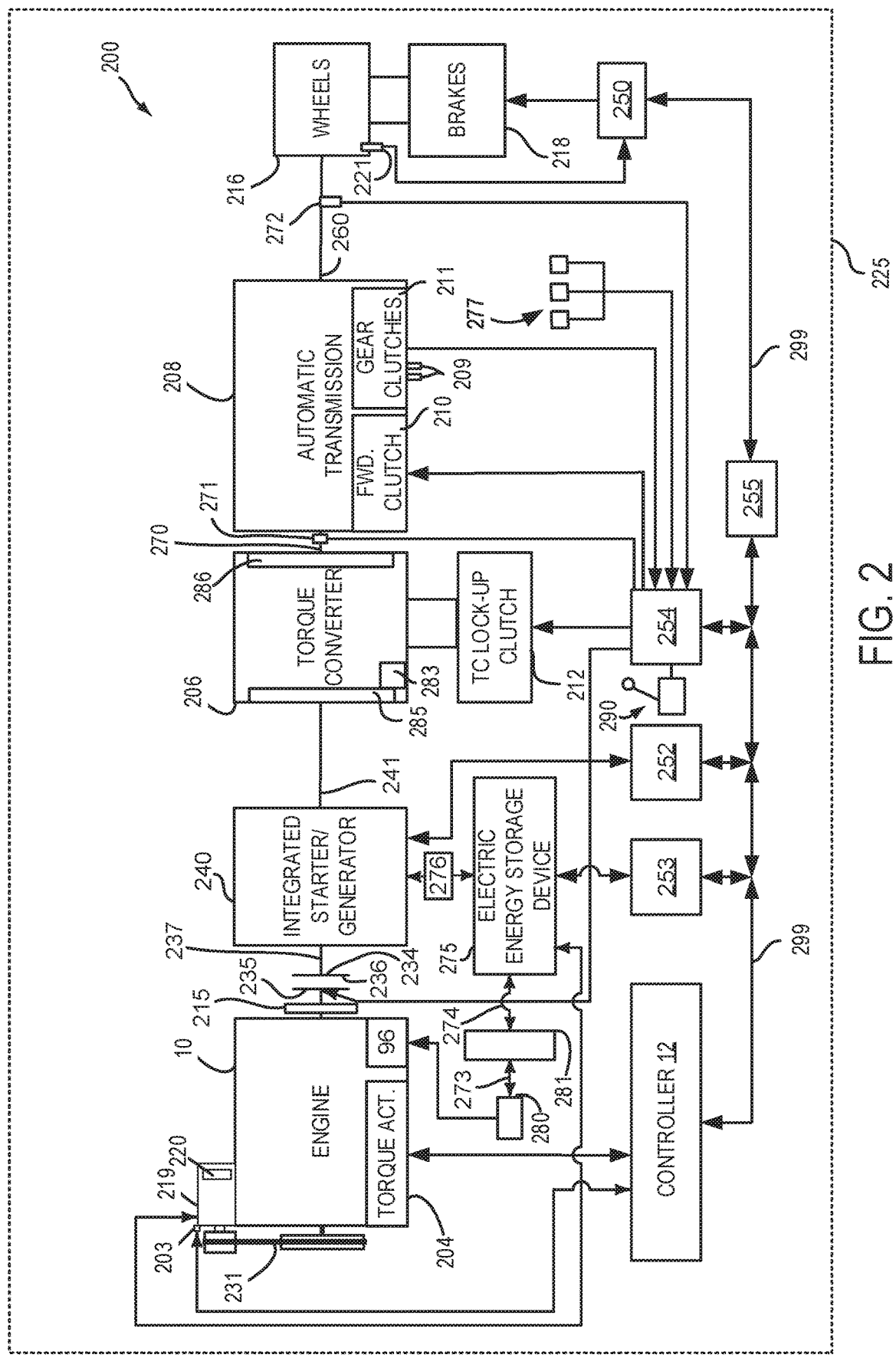
FIG. 2 is a schematic diagram of a hybrid vehicle driveline.
Figure 3:
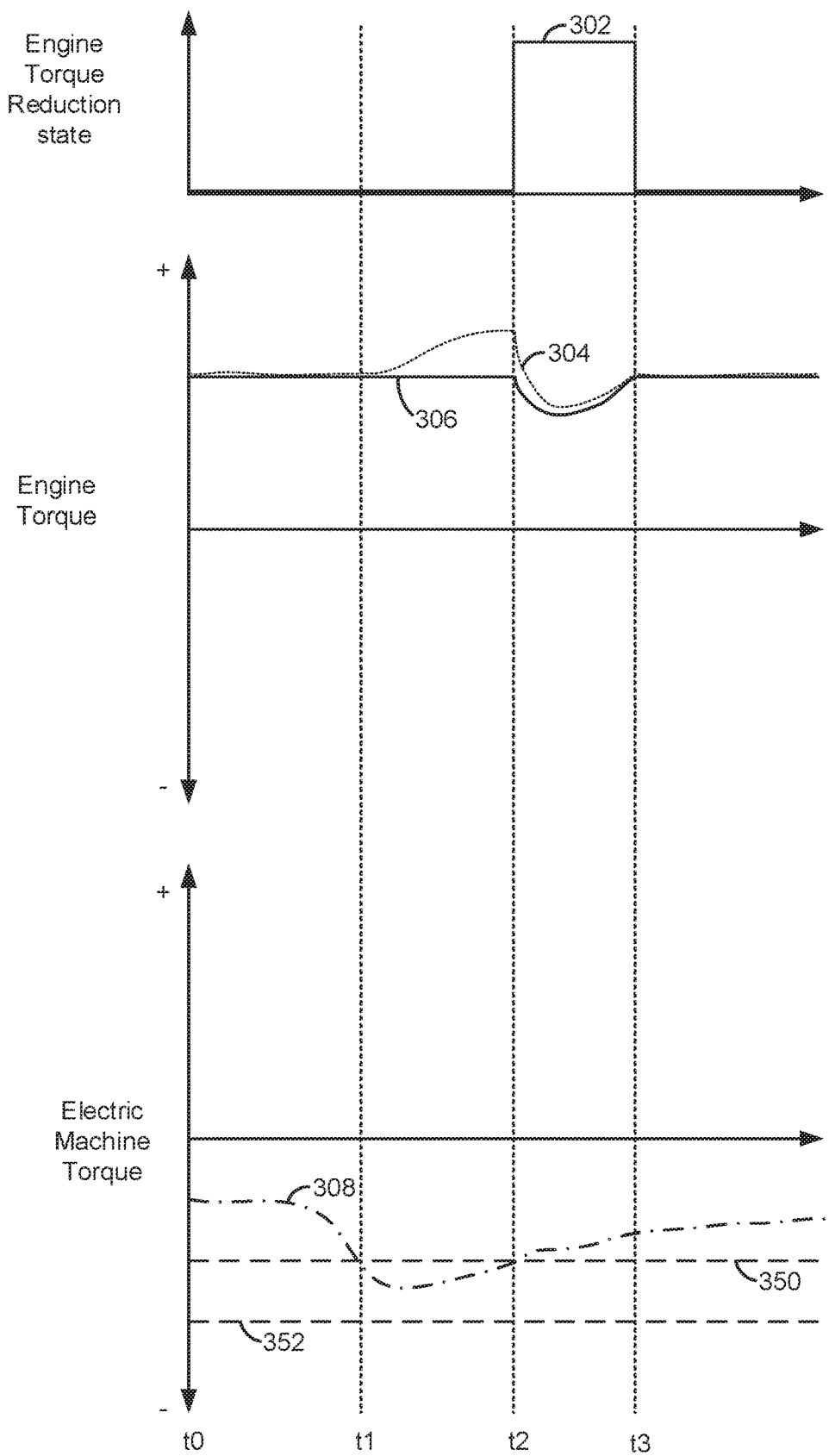
FIG. 3 shows a driveline operating sequence according to the method of FIG. 4.

The present description is related to operating a driveline of a hybrid vehicle. The driveline may include an engine of the type shown in FIG. 1. The hybrid driveline may be configures as shown in FIG. 2. The hybrid vehicle driveline may be operated via a controller as shown in FIG. 3. The hybrid driveline may be operated via the methods of FIGS. 4 and 5.

Figure 1:
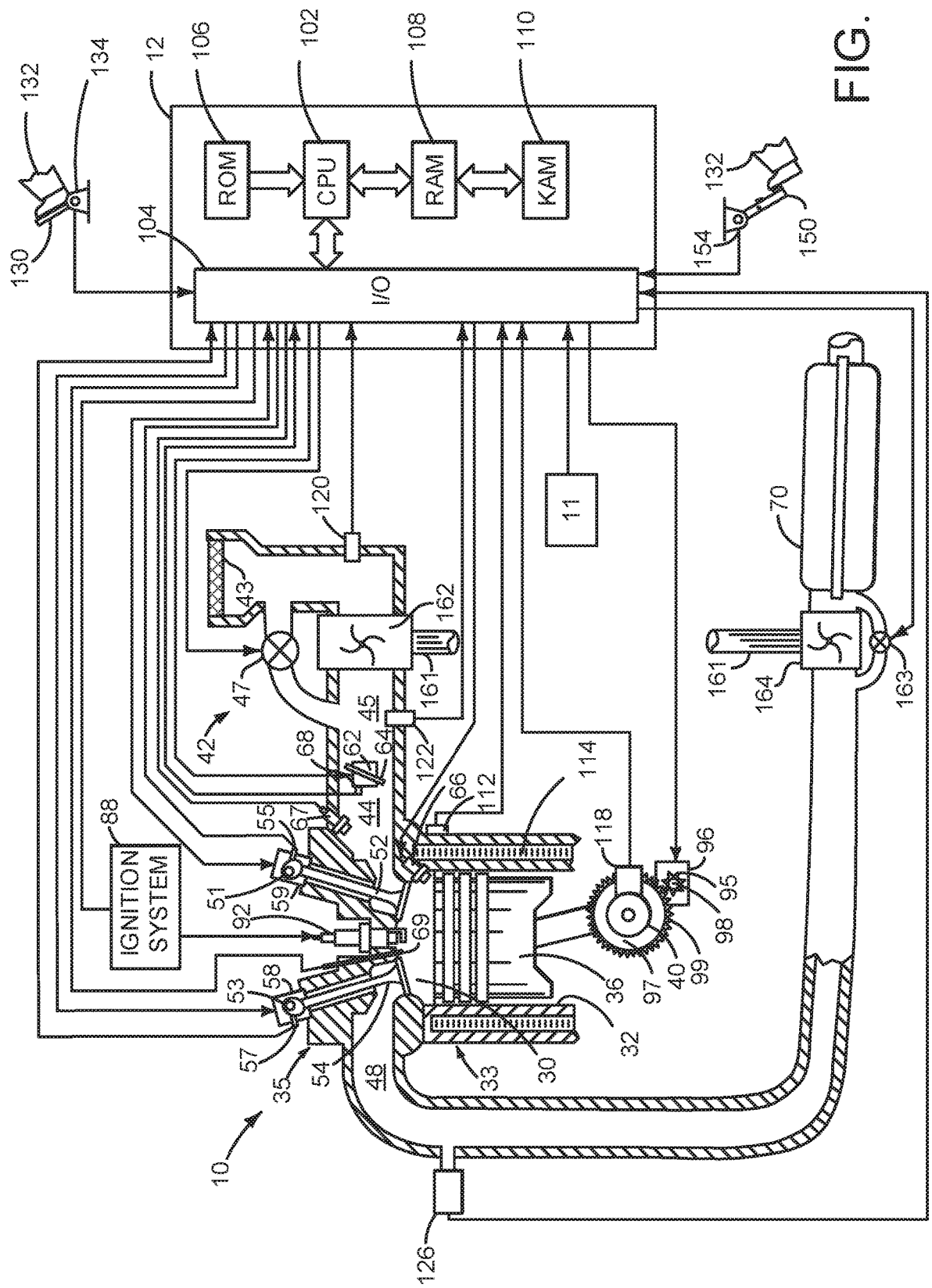
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2 and employs the actuators shown in FIGS. 1 and 2 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst filter 70 can include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via belt integrated starter/generator (BISG) 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

BISG is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with inverter 276, and inverter 276 is in electrical communication with energy storage device 275. Inverter 276 may convert direct current (DC) power from electric energy storage device into alternating current (AC) power to operate ISG 240 as a motor. Alternatively, inverter 276 may convert AC power from ISG 240 into DC power to store in electric energy storage device 275. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold value) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift lever may include positions for gears 1-N (where N is the an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Referring now to FIG. 3, example plots of a driveline operating sequence are shown. The operating sequence may be performed via the system of FIGS. 1 and 2 in cooperation with the method of FIGS. 4 and 5. Vertical lines at times t0-t3 represent times of interest during the sequence. The plots in FIG. 3 are time aligned and occur at the same time. In this example, the engine is combusting fuel and rotating while operating in a torque control mode. The electric machine is operating in a speed control mode.

The first plot from the top of FIG. 3 is a plot indicating engine torque reduction state versus time. The vertical axis represents engine torque reduction state and engine torque is being reduced in response to electric machine torque approaching an electric machine minimum torque threshold (e.g., an electric machine torque threshold that a magnitude of electric machine torque is not permitted to exceed). Engine torque is being reduced in response to electric machine torque approaching an electric machine minimum torque threshold when trace 302 is at a higher level near the level of the vertical axis arrow. Engine torque is not being reduced in response to electric machine torque approaching an electric machine minimum torque threshold when trace 302 is at a lower level near the horizontal axis. The horizontal axis represents time and time increases from the left side of the figure to the right side of the figure. Line 302 represents the engine torque reduction state.

The second plot from the top of FIG. 3 is a plot of engine torque versus time. The vertical axis represents engine torque. The engine torque increases in the direction of the vertical axis arrow. The horizontal axis represents time and time increases from the left side of the figure to the right side of the figure. Line 304 represents an actual amount of engine torque. Line 306 represents a requested amount of engine torque.

The third plot from the top of FIG. 3 is a plot of electric machine torque versus time. The vertical axis represents an amount of electric machine torque that is generated and delivered to the driveline. The horizontal axis represents time and time increases from the left side of the figure to the right side of the figure. Line 308 represents an amount of electric machine torque. The electric machine torque is positive (e.g., rotating the driveline) when trace 308 is above the horizontal axis. The positive torque increases in the direction of the up pointing axis arrow. The electric machine torque is negative (e.g., generating electrical charge) when trace 308 is below the horizontal axis. The magnitude of the negative torque increases in the direction of the down pointing axis arrow. Line 350 represents a minimum electric machine torque threshold plus an offset torque. Line 352 represents a minimum electric machine torque threshold (e.g., a largest magnitude torque that the electric machine may absorb from the driveline).

At time t0, the actual engine torque and the requested engine torque are nearly equal. The electric machine is providing a middle level of negative torque (e.g., absorbing torque from the driveline to generate electric charge). The electric machine torque is above the minimum electric machine threshold and the minimum electric machine threshold plus the offset 350.

At time t1, the actual engine torque begins to exceed the requested engine torque, which causes the controller to adjust the electric machine torque to maintain a requested torque converter impeller speed. The actual engine torque continues to increase between time t1 and time t2. The electric machine regenerative or negative torque increases in magnitude to counteract the actual engine torque so that the torque converter impeller speed may be maintained at a requested torque converter impeller speed.

At time t2, the electric machine torque passes through the minimum electric machine torque plus the offset torque threshold 350. The actual engine torque is reduced in response to the electric machine torque passing through the minimum electric machine torque plus the offset torque threshold 350. The engine torque reduction state changes from a low value to a high value to indicate that engine torque is being reduced in response the electric machine torque passing through the minimum electric machine torque plus the offset torque threshold.

Between time t2 and time t3, the actual engine torque approaches the requested engine torque. The electric machine torque magnitude is reduced as the actual engine torque approaches the requested engine torque. The engine torque continues to be reduced and the engine remains in a torque reduction state.

At time t3, the actual engine torque and the requested engine torque match once again and so the engine exits the engine torque reduction state. The electric machine torque magnitude is reduced since the electric machine torque is no longer being used to counteract a difference between actual engine torque and requested engine torque.

In this way, the electric machine may be operated to counteract engine torque to control torque converter impeller speed. However, if the electric machine begins to approach its torque capacity, then engine torque may be reduced so that the torque converter impeller speed follows the requested torque converter impeller speed.

Figure 4:
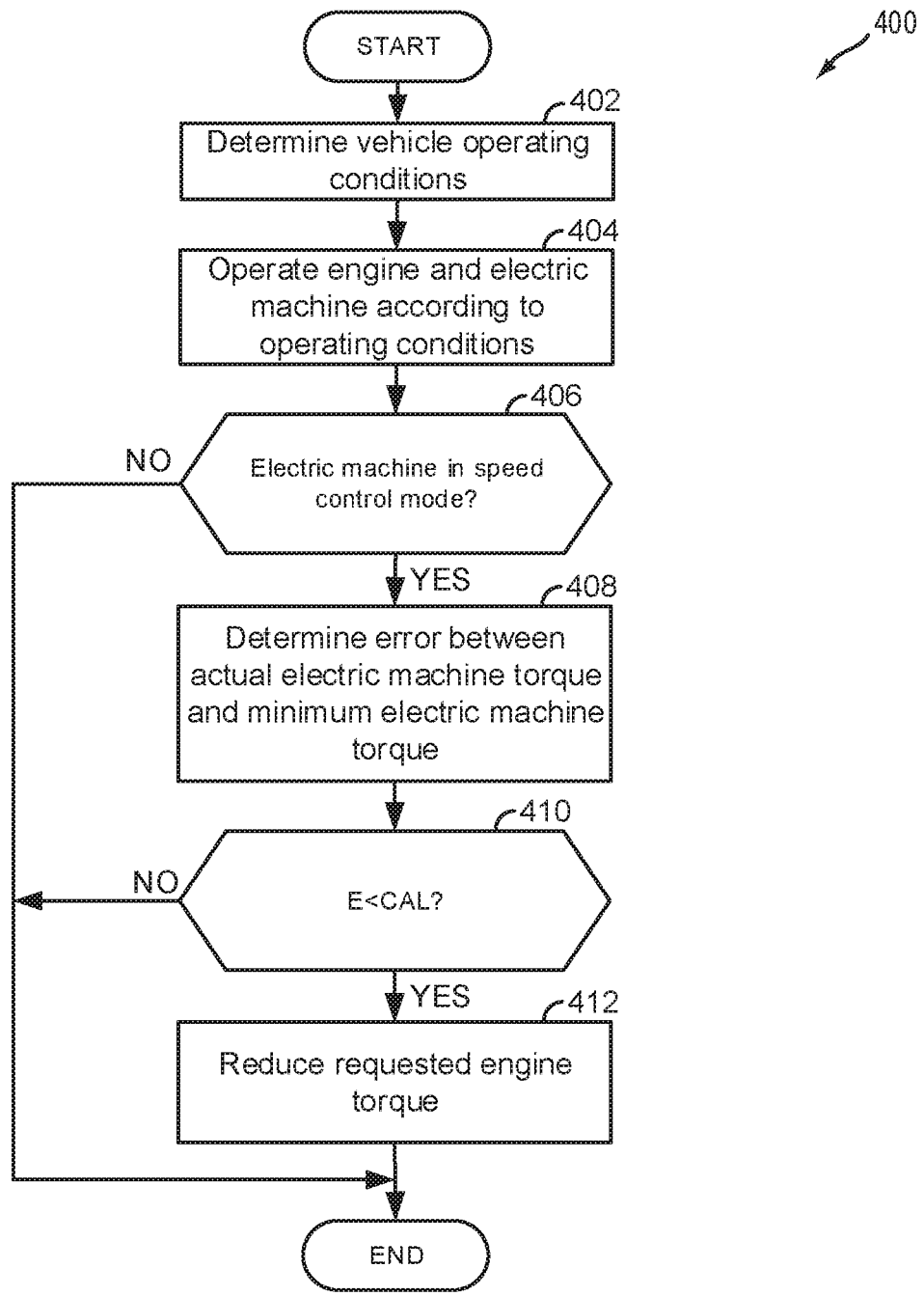
FIG. 4 shows a method for operating a driveline of a hybrid vehicle.

Referring now to FIG. 4, a flow chart of a method for operating a driveline to reduce the possibility of torque converter impeller speed flares is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world. Method 400 may be executed when a vehicle in which includes the engine and electric machine described herein is in a creep mode (e.g., providing a requested torque converter impeller speed when driver demand is zero and a brake pedal is not being applied) or when a vehicle's transmission is engaged in park or neutral and charging an electric energy storage device. The driveline disconnect clutch is fully closed when the method of FIG. 4 is being performed.

At 402, method 400 determines vehicle operating conditions. Vehicle operating conditions may include but are not limited to vehicle speed, engine speed, engine temperature, electric energy storage device state of charge (SOC), and driver demand torque. Driver demand torque may be determined by indexing or referencing a table or function of empirically determined driver demand torque values via accelerator pedal position and vehicle speed. Method 400 proceeds to 404.

At 404, method 400 operates the engine and the electric machine according to vehicle operating conditions. For example, if driver demand torque is low or zero and electric energy storage device charging is requested, then the engine may be operated in a torque control mode, the driveline disconnect clutch is closed, and the electric machine may be operated in a speed control mode. Further, the vehicle's transmission is engaged in park or neutral and electric energy storage device charging is requested, then the engine may be operated in a torque control mode, the driveline disconnect clutch is closed, and the electric machine may be operated in a speed control mode. Conversely, if driver demand torque is low and electric energy storage device charging is not requested, then the engine may be stopped, the driveline disconnect clutch may be opened, and the electric machine may provide torque to the driveline. If driver demand torque is high, then the engine may be combusting fuel and providing torque to the driveline, the driveline disconnect clutch may be fully closed, and the electric machine may provide torque to the driveline. Torque of the engine may be adjusted to provide a desired electric energy storage device charging torque. Method 400 proceeds to 406.

At 406, method 400 judges if the electric machine is in a speed control mode and the driveline disconnect clutch is closed. In some examples, method 400 may also judge if the engine is operating in a torque control mode. If so, the answer is yes and method 400 proceeds to 408. Otherwise, the answer is no and method 400 proceeds to exit.

At 408, method 400 determines an error amount between the torque of the electric machine and a minimum electric machine torque plus offset torque threshold (e.g., as shown in FIG. 3). The error may be expressed as:

$$\text{Error} = \tau_{mtr} - \tau_{mtr\_min}$$

where Error is the difference between the present electric machine torque and the electric machine minimum torque threshold, $\tau_{mtr}$ is the present electric machine torque, and $\tau_{mtr\_min}$ is the electric machine minimum torque threshold (e.g., 352 of FIG. 3). Method 400 proceeds to 410.

At 410, method 400 judges if the error value determined at 408 is less than a predetermined value (e.g., CAL—a calibration parameter). If so, the answer is yes and method 400 proceeds to 412. Otherwise, the answer is no and method 400 proceeds to exit.

At 412, method 400 reduces engine torque so that engine torque does not overcome or the electric machine regeneration torque, thereby causing the engine and the electric machine speed to increase. The engine torque may be reduced via at least partially closing the engine throttle, retarding spark timing, reducing fuel flow to the engine, and/or adjusting engine cam timing. In one example, the engine torque may be adjusted based on the magnitude of the error. If the error value is large, the engine torque may be reduced a larger amount by commanding a larger reduction of engine torque. If the error value is small, the engine torque may be reduced a smaller amount by commanding a smaller reduction of engine torque. Method 400 proceeds to exit after commanding a reduced engine torque.

In this way, an amount of torque that is delivered to a torque converter impeller may be controlled so that an error in torque generated by the engine may not cause the torque converter impeller speed to increase by a significant amount.

The torque converter impeller torque (e.g., the sum of engine torque and electric machine torque) may be controlled to a desired level via the electric machine while the electric machine regulates torque converter impeller speed. However, if engine torque increases to a level where the electric machine approaches an electric machine minimum torque threshold, then engine torque may be reduced so that torque converter impeller speed may remain close to a requested torque converter impeller speed.

Figure 5:
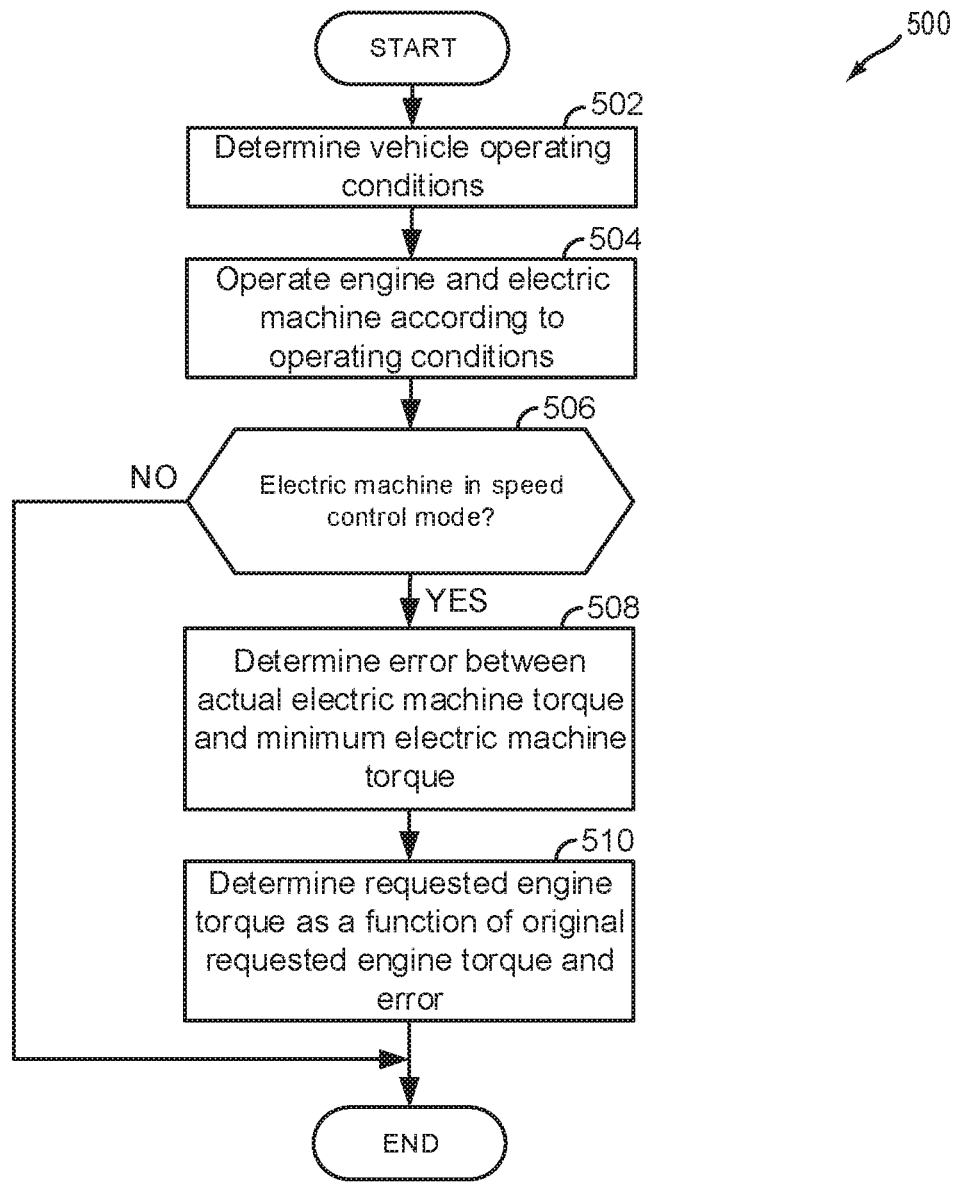
FIG. 5 shows an alternative method for operating a driveline of a hybrid vehicle.

Referring now to FIG. 5, a flow chart of a method for operating a driveline to reduce the possibility of torque converter impeller speed flares is shown. The method of FIG. 5 may be incorporated into and may cooperate with the system of FIGS. 1 and 2. Further, at least portions of the method of FIG. 5 may be incorporated as executable instructions stored in non-transitory memory while other portions of the method may be performed via a controller transforming operating states of devices and actuators in the physical world. Method 500 may be executed when a vehicle in which includes the engine and electric machine described herein is in a creep mode (e.g., providing a requested torque converter impeller speed when driver demand is zero and a brake pedal is not being applied) or when a vehicle's transmission is engaged in park or neutral and charging an electric energy storage device. The driveline disconnect clutch is fully closed when the method of FIG. 5 is being performed.

At 502, method 500 determines vehicle operating conditions. Vehicle operating conditions may include but are not limited to vehicle speed, engine speed, engine temperature, electric energy storage device state of charge (SOC), and driver demand torque. Driver demand torque may be determined by indexing or referencing a table or function of empirically determined driver demand torque values via accelerator pedal position and vehicle speed. Method 500 proceeds to 504.

At 504, method 500 operates the engine and the electric machine according to vehicle operating conditions. For example, if driver demand torque is low or zero and electric energy storage device charging is requested, then the engine may be operated in a torque control mode, the driveline disconnect clutch is closed, and the electric machine may be operated in a speed control mode. Further, the vehicle's transmission is engaged in park or neutral and electric energy storage device charging is requested, then the engine may be operated in a torque control mode, the driveline disconnect clutch is closed, and the electric machine may be operated in a speed control mode. Conversely, if driver demand torque is low and electric energy storage device charging is not requested, then the engine may be stopped, the driveline disconnect clutch may be opened, and the electric machine may provide torque to the driveline. If driver demand torque is high, then the engine may be combusting fuel and providing torque to the driveline, the driveline disconnect clutch may be fully closed, and the electric machine may provide torque to the driveline. Method 500 proceeds to 506.

At 506, method 500 judges if the electric machine is in a speed control mode and the driveline disconnect clutch is closed. In some examples, method 500 may also judge if the engine is operating in a torque control mode. If so, the answer is yes and method 500 proceeds to 508. Otherwise, the answer is no and method 500 proceeds to exit.

At 508, method 400 determines an error amount between the torque of the electric machine and a minimum electric machine torque plus offset torque threshold (e.g., as shown in FIG. 3). The error may be expressed as:

$$\text{Error}=\min(0,\tau_{mtr\_min}+\text{CAL})-\tau_{mtr}$$

where Error is the difference between the present electric machine torque and the electric machine minimum torque threshold plus an offset torque, $\tau_{mtr}$ is the present or actual electric machine torque, and $\tau_{mtr\_min}$ is the electric machine minimum torque threshold (e.g., 352 of FIG. 3), CAL is an offset torque, min is a function that returns whichever is a lesser value of zero and $\tau_{mtr\_min}$+CAL. Method 500 proceeds to 510.

At 510, method 500 reduces engine torque based on the error value determined at 508. In one example, method 500 adjusts engine torque according to the following equation:

$$\tau_{eng\_cmd}=\tau_{eng\_req}-Ki\int e\cdot dt$$

where $\tau_{eng\_cmd}$ is the engine torque command, $\tau_{eng\_req}$ is the requested engine torque, Ki is a scalar (e.g., real number) multiplier or gain, e is the error determined at 508, and dt is the time based integration parameter. Alternatively, the engine torque command may be determined via the following equation:

$$\tau_{eng\_cmd}=\min(\text{CAL},\text{MaX}(0,\tau_{eng\_req}))$$

where $\tau_{eng\_cmd}$ is the engine torque command, $\tau_{eng\_req}$ is the requested engine torque, CAL is a predetermined torque value, max is a function that returns a greater value of 0 or $\tau_{eng}$_req, and min is a function that returns a lesser value of CAL and the output of max. Method 500 proceeds to exit.

Thus, the method of FIGS. 4 and 5 provide for a driveline operating method, comprising: via a controller, operating an engine in a torque control mode and an electric machine in a speed control mode; and reducing torque of the engine in response to an error torque, the error torque an electric machine torque minus a minimum torque of the electric machine. The method includes where the minimum torque of the electric machine is a torque of largest magnitude that the electric machine may absorb from the driveline. The method includes where the engine torque is reduced via at least partially closing a throttle, and where the error torque is less than a threshold torque. The method includes where the engine torque is reduced via retarding engine spark timing. The method includes where the engine torque is reduced via reducing fuel flow to the engine. The method includes where the torque control mode includes adjusting engine torque to meet a requested torque and allowing engine speed to vary. The method includes where the speed control mode includes adjusting electric machine speed to meet a requested speed and allowing electric machine torque to vary. The method further comprises operating the engine in the torque control mode and the electric machine in the speed control mode when a transmission is engaged in neutral.

The method of FIGS. 4 and 5 provide for a driveline operating method, comprising: via a controller, operating an engine in a torque control mode and an electric machine in a speed control mode; and commanding torque of the engine to a requested engine torque minus a factor multiplied by an integral of an error torque, the error torque an electric machine torque minus a minimum torque of the electric machine. The method includes where the factor is a scalar. The method includes where the minimum torque of the electric machine is a torque of largest magnitude that the electric machine may absorb from the driveline. The method includes where the engine torque is reduced via at least partially closing a throttle. The method includes where the engine torque is reduced via retarding engine spark timing. The method further comprises operating the engine in the torque control mode and the electric machine in the speed control mode while a driveline is operating in a creep mode. The method further comprises operating the engine in the torque control mode and the electric machine in the speed control mode when a transmission is engaged in park or neutral.

In another representation, the method of FIGS. 4 and 5 provides for a driveline operating method, comprising: via a controller, operating an engine in a torque control mode and an electric machine in a speed control mode; and commanding torque of the engine to a lesser of a predetermined torque and a first value, the first value a greater of zero and a requested engine torque. The method further comprising operating the engine in the torque control mode and the electric machine in the speed control mode when a transmission is engaged in park or neutral.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A driveline operating method, comprising:
    via a controller, operating an engine in a torque control mode where engine torque is adjusted by the controller to follow a desired torque while engine speed is allowed to vary to meet the desired torque, and operating an electric machine in a speed control mode where electric machine speed is adjusted by the controller to follow a desired speed while electric machine torque is allowed to vary to meet the desired speed; and
    while operating the engine in the torque control mode and the electric machine in the speed control mode, reducing, via the controller, torque of the engine in response to an error torque, the error torque calculated as an electric machine torque minus a minimum torque of the electric machine.

2. The method of claim 1, where the minimum torque of the electric machine is a torque of largest magnitude that the electric machine may absorb from a driveline.

3. The method of claim 1, where the torque of the engine is reduced via at least partially closing a throttle, and wherein the error torque is less than a threshold torque.

4. The method of claim 1, where the torque of the engine is reduced via retarding engine spark timing.

5. The method of claim 1, where the torque of the engine is reduced via reducing fuel flow to the engine.

6. The method of claim 1, further comprising operating the engine in the torque control mode and the electric machine in the speed control mode when a transmission is engaged in neutral.

7. A driveline operating method, comprising:
via a controller, while a driveline is operating in a creep mode that includes providing a requested torque converter impeller speed when driver demand is zero and a brake pedal is not being applied, the creep mode including operating an engine in a torque control mode where engine torque is adjusted by the controller to follow a desired torque while engine speed is allowed to vary to meet the desired torque, and operating an electric machine in a speed control mode where electric machine speed is adjusted by the controller to follow a desired speed while electric machine torque is allowed to vary to meet the desired speed; and
commanding torque of the engine to a requested engine torque minus a factor multiplied by an integral of an error torque, the error torque an electric machine torque minus a minimum torque of the electric machine.

8. The method of claim 7, where the factor is a scalar.

9. The method of claim 7, where the minimum torque of the electric machine is a torque of largest magnitude that the electric machine may absorb from a driveline.

10. The method of claim 7, where the torque of the engine is reduced via at least partially closing a throttle.

11. The method of claim 7, where the torque of the engine is reduced via retarding engine spark timing.

12. A system, comprising:
an engine;
an electric machine;
a driveline disconnect clutch included in a driveline and located between the engine and the electric machine, the driveline disconnect clutch coupled to the engine and the electric machine; and
a controller including executable instructions stored in non-transitory memory to adjust a torque of the engine in response to an error, the error a minimum electric machine torque plus an offset torque minus an actual electric machine torque while operating the engine in a torque control mode where engine torque is adjusted by the controller to follow a desired torque while engine speed is allowed to vary to meet the desired torque, and while operating the electric machine in a speed control mode where electric machine speed is adjusted by the controller to follow a desired speed while electric machine torque is allowed to vary to meet the desired speed.

13. The system of claim 12, further comprising additional executable instructions to adjust the torque of the engine in response to a requested engine torque minus an integration of the error.

14. The system of claim 13, further comprising a torque converter coupled to a transmission and the electric machine.

* * * * *